(12) United States Patent
Bohnen et al.

(10) Patent No.: US 6,391,989 B1
(45) Date of Patent: May 21, 2002

(54) CATALYST SYSTEM, METHOD FOR PRODUCING SAME AND ITS USE FOR THE POLYMERIZATION OF OLEFINS

(75) Inventors: Hans Bohnen, Moers; Cornelia Fritze, Frankfurt; Frank Kueber, Oberursel, all of (DE)

(73) Assignee: Basell Polypropylen GmbH, Mainz (DE)

( * ) Notice: Subject to any disclaimer, the term of this patent is extended or adjusted under 35 U.S.C. 154(b) by 0 days.

(21) Appl. No.: 09/622,417

(22) PCT Filed: Feb. 13, 1999

(86) PCT No.: PCT/EP99/00956

§ 371 (c)(1),
(2), (4) Date: Aug. 16, 2000

(87) PCT Pub. No.: WO99/43717

PCT Pub. Date: Sep. 2, 1999

(30) Foreign Application Priority Data

Feb. 27, 1998 (DE) .......................... 198 08 253

(51) Int. Cl.⁷ .......................... B01J 31/00; B01J 37/00; C08F 4/02; C08F 4/60
(52) U.S. Cl. .................. 526/134; 526/130; 526/170; 526/943; 526/123.1; 502/120; 502/121; 502/128; 502/152; 502/155
(58) Field of Search ................ 526/123.1, 130, 526/134, 170, 193, 943; 502/120, 121, 128, 152, 155

(56) References Cited

U.S. PATENT DOCUMENTS 4,898,802 A    2/1990  Hsieh
6,124,123 A  * 9/2000  Fritze et al. ................ 526/134

FOREIGN PATENT DOCUMENTS

| CA | 2212668 | 2/1998 |
|----|---------|--------|
| EP | 520 732 | 12/1992 |
| EP | 558 158 | 9/1993 |
| EP | 427 697 | 5/1996 |
| EP | 824 113 | 2/1998 |
| WO | 95/24268 | 9/1995 |
| WO | 97/29845 | 8/1997 |

* cited by examiner

Primary Examiner—David W. Wu
Assistant Examiner—Caixia Lu
(74) Attorney, Agent, or Firm—Keil & Weinkauf

(57) ABSTRACT

A catalyst system comprising
a) at least one support,
b) at least one metallocene and
c) at least one compound of the formula (I)

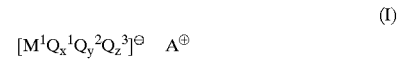

where
$M^1$ is an element of group IIa, IIIa, IVa or Va of the Periodic Table of the Elements,
x is 0 or 1,
y is 0 or 1,
z is 0 or 1,
A is a cation of group Ia, IIa, IIIa of the Periodic Table of the Elements, a carbenium, oxonium, phosphonium or sulfonium cation or a quaternary ammonium compound,
$Q^1$, $Q^2$, $Q^3$ are each a ligand system based on a biphenyl framework bound to $M^1$ via the positions 2 and 12 and having the formula (II)

(II)

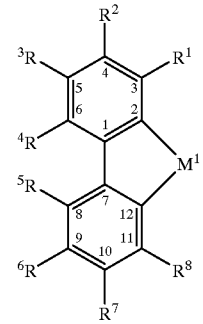

where
$R^1$, $R^2$, $R^3$, $R^4$, $R^5$, $R^6$, $R^7$ and $R^8$ are identical or different and are each a hydrogen atom, a halogen atom, a $C_1$–$C_{40}$ group, or an $OSiR_3^9$ group, where $R^9$ are identical or different and are each a hydrogen atom, a halogen atom, a $C_1$–$C_{40}$ group and two or more radicals $R^1$ to $R^8$ may be joined to one another so as to form a monocyclic or polycyclic ring system which may be substituted.

11 Claims, No Drawings

CATALYST SYSTEM, METHOD FOR PRODUCING SAME AND ITS USE FOR THE POLYMERIZATION OF OLEFINS

The present invention relates to catalyst systems, a process for preparing them and their use in the polymerization of olefins.

Ziegler-type catalysts based on angled metallocenes containing metals of group 4 form a new generation of catalysts which can be used industrially for the polymerization of α-olefins (H. H. Brintzinger, D. Fischer, R. Mülhaupt, R. Rieger, R. Waymouth, Angew. Chem. 1995, 107, 1255–1283).

To obtain an active catalyst system, the metallocene complex is treated with a large excess of methylaluminoxane (MAO) (H. Sinn, W. Kaminsky, Adv. Organomet. Chem., 1980, 18, 99). Apart from the high cocatalyst costs, this has the disadvantage of a high aluminum content in the resulting polymer. For this reason, new activation methods which make do without a superstoichiometric amount of activator have been developed. The synthesis of "cation-like" metallocene polymerization catalysts is described in J. Am. Chem. Soc. 1991, 113, 3623. In this synthesis, the alkyl group is abstracted from an alkyl-metallocene compound by means of trispentafluorophenylborane which is used in a stoichiometric amount based on the metallocene.

EP-A-0,427,697 claims this synthetic principle and a corresponding catalyst system comprising an uncharged metallocene species (e.g. $Cp_2ZrMe_2$), a Lewis acid (e.g. $B(C_6F_5)_3$) and aluminum alkyls. A process for preparing salts of the formula $LMX^+ XA^-$ according to the above-described principle is claimed in EP-A-0,520,732.

EP-A-0,558,158 describes zwitterionic catalyst systems prepared from dialkyl-metallocene compounds and salts of the formula $[R_3NH]^+[BPh_4]^-$. The reaction of such a salt with, for example, $Cp_2^*ZrMe_2$ results in protolysis and elimination of methane to give a methyl-zirconocene cation as an intermediate. This reacts via C—H activation to form the zwitterion $Cp_2^*Zr^+\text{-}(m\text{-}C_6H_4)\text{-}BPh_3^-$. In this zwitterion, the Zr atom is covalently bound to a carbon atom of the phenyl ring and is stabilized by means of an agostic hydrogen bond.

US-A-5,384,299 claims corresponding systems in which dimethylanilinium salts with perfluoriated tetraphenylborates are used.

Apart from the activating action of the borate salts, their ligand sphere has an important effect on reaction equilibrium. Large bulky ligands substantially prevent dimerization of the metallocenium fragments and thus displace the position of the equilibrium to the side of the catalytically active species. The mononuclear borate anions described hitherto have four aryl ligands and can, by incorporation of bulky groups on the ligand, exercise an influence on the reaction equilibrium (WO 95/24268). Disadvantages of these systems are the complicated syntheses and also the extreme sensitivity of the resulting metallocenium complexes.

It is an object of the present invention to provide an inexpensive catalyst system which has the advantages of bulky ligands but avoids the disadvantages of the existing bulky aryl ligands.

We have found that this object is achieved by a catalyst system comprising a) at least one support,
b) at least one metallocene and
c) at least one compound of the formula (I)

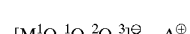
(I)

where
$M^1$ is an element of group IIa, IIIa, IVa or Va of the Periodic Table of the Elements,
x is 0 or 1,
y is 0 or 1,
z is 0 or 1,
A is a cation of group Ia, IIa, IIIa of the Periodic Table of the Elements, a carbenium, oxonium, phosphonium or sulfonium cation or a quaternary ammonium compound,
$Q^1$, $Q^2$, $Q^3$ are each a ligand system based on a biphenyl framework bound to $M^1$ via the positions 2 and 12 and having the formula (II),

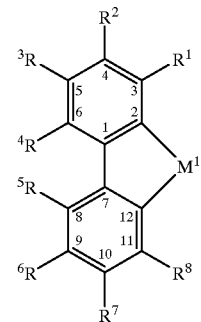
(II)

where
$R^1$, $R^2$, $R^3$, $R^4$, $R^5$, $R^6$, $R^7$ and $R^8$ are identical or different and are each a hydrogen atom, a halogen atom, a $C_1$–$C_{40}$ group, preferably $C_1$–$C_{20}$-alkyl, $C_1$–$C_{20}$-haloalkyl, $C_1$–$C_{10}$-alkoxy, $C_6$–$C_{40}$-aryl, $C_6$–$C_{40}$-haloaryl, $C_6$–$C_{40}$-aryloxy, $C_7$–$C_{40}$-arylalkyl, $C_7$–$C_{40}$-haloarylalkyl or $C_7$–$C_{40}$-haloalkylaryl, or an $OSiR_3^9$ group, where $R^9$ are identical or different and are each a hydrogen atom, a halogen atom, a $C_1$–$C_{40}$ group, preferably $C_1$–$C_{20}$-alkyl, $C_1$–$C_{20}$-haloalkyl, $C_1$–$C_{10}$-alkoxy, $C_6$–$C_{40}$-aryl, $C_6$–$C_{40}$-haloaryl, $C_6$–$C_{40}$-aryloxy, $C_7$–$C_{40}$-arylalkyl, $C_7$–$C_{40}$-haloarylalkyl or $C_7$–$C_{40}$-haloalkylaryl, and two or more radicals $R^1$ to $R^8$ may be joined to one another so as to form a monocyclic or polycyclic ring system which may be substituted.

The compounds of the formula (I) are particularly preferably ones in which $M^1$ is boron. Such compounds have the formula (III)

(III)

where
A is a cation of group Ia, IIa, IIIa of the Periodic Table of the Elements, a carbenium, oxonium, phosphonium or sulfonium cation or a quaternary ammonium compound,
$Q^1$ and $Q^2$ are identical or different and are each a ligand system based on a biphenyl framework bound to B via the positions 2 and 12, where Q corresponds to the formula (II).

A similarly preferred compound of the formula (I) is a compound in which $M^1$ is phosphorus. Such compounds have the formula (IV)

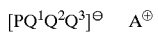
(IV)

where

A is a cation of group Ia, IIa, IIIa of the Periodic Table of the Elements, a carbenium, oxonium, phosphonium or sulfonium cation or a quaternary ammonium compound, $Q^1$, $Q^2$, $Q^3$ are identical or different and are each a ligand system based on a biphenyl framework bound to P via the positions 2 and 12, where Q corresponds to the formula (II).

Particularly preferred but nonlimiting examples of chemical compounds of the formulae (III) and (IV) according to the present invention are:

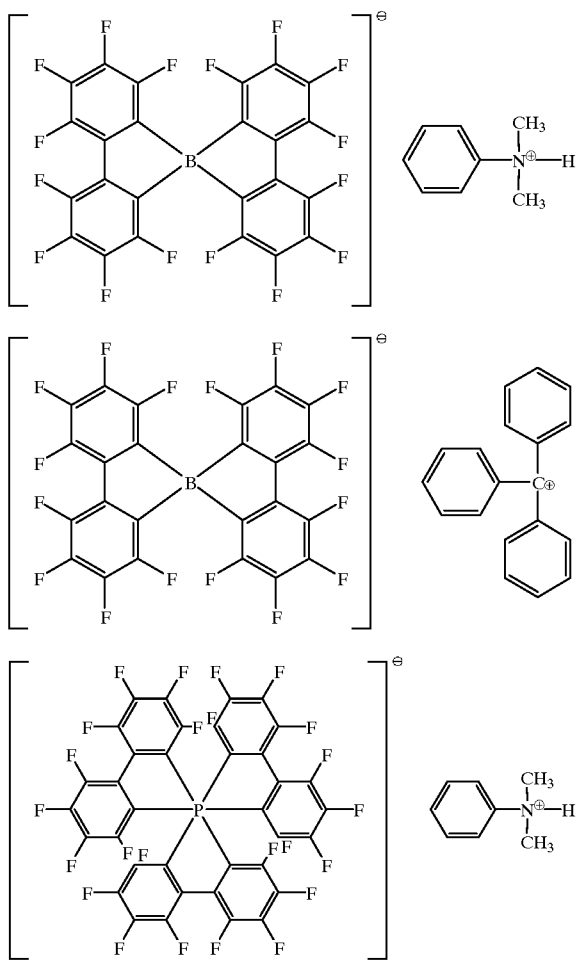

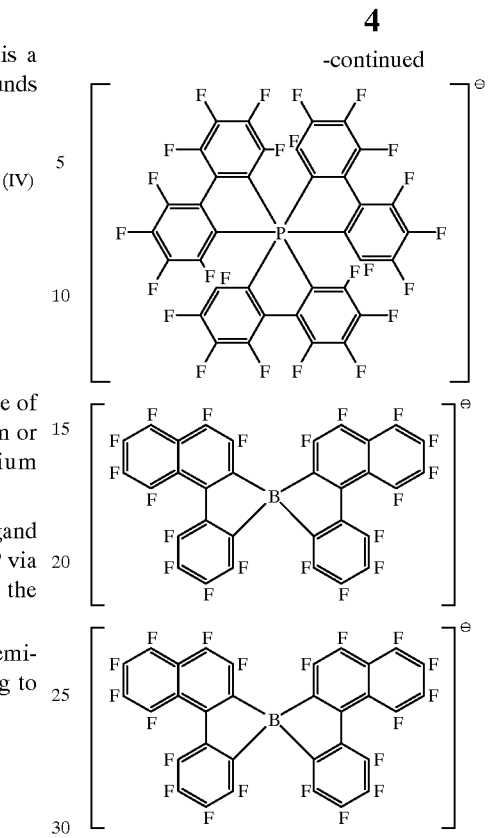

The catalyst system of the present invention comprises at least one metallocene, where this can be ionized by the cation A and an ion pair of metallocene cation and a noncoordinating or only weakly coordinating anion is formed.

The chemical compounds of the formula (II) according to the present invention can be used together with an organometallic transition metal compound as catalyst system. Organometallic transition metal compounds used are, for example, metallocene compounds. These can be, for example, bridged or unbridged biscyclopentadienyl complexes as described, for example, in EP-A-0 129 368, EP-A-0 561 479, EP-A-0 545 304 and EP-A-0 576 970, monocyclopentadienyl complexes such as bridged amidocyclopentadienyl complexes as described, for example, in EP-A-0 416 815, multinuclear cyclopentadienyl complexes as described in EP-A-0 632 063, π-ligand-substituted tetrahydropentalenes as described in EP-A-0 659 758 or π-ligand-substituted tetrahydroindenes as described in EP-A-0 661 300. In addition, it is possible to use organometallic compounds in which the complexing ligand contains no cyclopentadienyl ligand. Examples of such complexes are diamine complexes of transition groups III and IV of the Periodic Table of the Elements, as described, for example, in D. H. McConville et al., Macromolecules, 1996, 29, 5241 and D. H. McConville et al., J. Am. Chem. Soc., 1996, 118, 10008. It is also possible to use diimine complexes of transition group VIII of the Period Table of the Elements (e.g. $Ni^{2+}$ or $Pd^{2+}$ complexes), as described in Brookhart et al., J. Am. Chem. Soc. 1995, 117, 6414 and Brookhart et al., J. Am. Chem. Soc., 1996, 118, 267. Furthermore, it is possible to use 2,6-bis(imino)pyridyl complexes of transition group VIII of the Periodic Table of the Elements (e.g. $Co^{2+}$ or $Fe^{2+}$ complexes), as described in Brookhart et al., J. Am. Chem. Soc. 1998, 120, 4049 and Gibson et al., Chem. Commun. 1998, 849.

Preferred metallocene compounds are unbridged or bridged compounds of the formula (V),

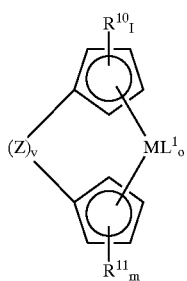

(V)

where

M is a metal of transition group III, IV, V or VI of the Periodic Table of the Elements, in particular Ti, Zr or Hf, $R^{10}$ are identical or different and are each a hydrogen atom or $SiR_3^{12}$, where $R^{12}$ are identical or different and are each a hydrogen atom or a $C_1$–$C_{40}$ group, preferably $C_1$–$C_{20}$-alkyl, $C_1$–$C_{10}$-fluoroalkyl, $C_1$–$C_{10}$-alkoxy, $C_6$–$C_{20}$-aryl, $C_6$–$C_{10}$-fluoroaryl, $C_6$–$C_{10}$-aryloxy, $C_2$–$C_{10}$-alkenyl, $C_7$–$C_{40}$-arylalkyl, $C_7$–$C_{40}$-alkylaryl or $C_8$–$C_{40}$-arylalkenyl, or $R^{10}$ is a $C_1$–$C_{30}$ group, preferably $C_1$–$C_{25}$-alkyl such as methyl, ethyl, tert-butyl, cyclohexyl or octyl, $C_2$–$C_{25}$-alkenyl, $C_3$–$C_{15}$-alkylalkenyl, $C_6$–$C_{24}$-aryl, $C_5$–$C_{24}$-heteroaryl such as pyridyl, furyl or quinolyl, $C_7$–$C_{30}$-arylalkyl, $C_7$–$C_{30}$-alkylaryl, fluorinated $C_1$–$C_{25}$-alkyl, fluorinated $C_6$–$C_{24}$-aryl, fluorinated $C_7$–$C_{30}$-arylalkyl, fluorinated $C_7C_{30}$-alkylaryl or $C_1$–$C_{12}$-alkoxy, or two or more radicals $R^{10}$ may be joined to one another in such a way that the radicals $R^{10}$ and the atoms of the cyclopentadienyl ring which connect them form a $C_4$–$C_{24}$ ring system which may in turn be substituted, $R^{11}$ are identical or different and are each a hydrogen atom or $SiR_3^{12}$, where $R^{12}$ are identical or different and are each a hydrogen atom or a $C_1$–$C_{40}$ group, preferably $C_1$–$C_{20}$-alkyl, $C_1$–$C_{10}$-fluoroalkyl, $C_1$–$C_{10}$-alkoxy, $C_6$–$C_{14}$-aryl, $C_6$–$C_{10}$-fluoroaryl, $C_6$–$C_{10}$-aryloxy, $C_2$–$C_{10}$-alkenyl, $C_7$–$C_{40}$-arylalkyl, $C_7$–$C_{40}$-alkylaryl or $C_8$–$C_{40}$-arylalkenyl, or $R^8$ is a $C_1$–$C_{30}$ group, preferably $C_1$–$C_{25}$-alkyl such as methyl, ethyl, tert-butyl, cyclohexyl or octyl, $C_2$–$C_{25}$-alkenyl, $C_3$–$C_{15}$-alkylalkenyl, $C_6$–$C_{24}$-aryl, $C_5$–$C_{24}$-heteroaryl such as pyridyl, furyl or quinolyl, $C_7$–$C_{30}$-arylalkyl, $C_7$–$C_{30}$-alkylaryl, fluorinated $C_1$–$C_{25}$-alkyl, fluorinated $C_6$–$C_{24}$-aryl, fluorinated $C_7$–$C_{30}$-arylalkyl, fluorinated $C_7$–$C_{30}$-alkylaryl or $C_1$–$C_{12}$-alkoxy, or two or more radicals $R^{11}$ may be joined to one another in such a way that the radicals $R^{11}$ and the atoms of the cyclopentadienyl ring which connect them form a $C_4$–$C_{24}$ ring system which may in turn be substituted, l is 5 when v=0, and l is 4 when v=1, m is 5 when v=0, and m is 4 when v=1, $L^1$ may be identical or different and are each a hydrogen atom, a $C_1$–$C_{10}$-hydrocarbon group such as $C_1$–$C_{10}$-alkyl or $C_6$–$C_{10}$-aryl, a halogen atom or $OR^{16}$, $SR^{16}$, $OSiR_3^{16}$, $SiR_3^{16}$, $PR_2^{16}$ or $NR_2^{16}$, where $R^{16}$ is a halogen atom, a $C_1$–$C_{10}$-alkyl group, a halogenated $C_1$–$C_{10}$-alkyl group, a $C_6$–$C_{20}$-aryl group or a halogenated $C_6$–$C_{20}$-aryl group, or $L^1$ are each a toluenesulfonyl, trifluoroacetyl, trifluoroacetoxyl, trifluoromethanesulfonyl, nonafluorobutanesulfonyl or 2,2,2-trifluoroethanesulfonyl group, o is an integer from 1 to 4, preferably 2, Z is a bridging structural element between the two cyclopentadienyl rings and v is 0 or 1.

Examples of Z are $M^2R^{13}R^{14}$ groups, where $M^2$ is carbon, silicon, germanium or tin and $R^{13}$ and $R^{14}$ are identical or different and are each a $C_1$–$C_{20}$-hydrocarbon-containing group such as $C_1$–$C_{10}$-alkyl, $C_6$–$C_{14}$-aryl or trimethylsilyl. Z is preferably $CH_2$, $CH_2CH_2$, $CH(CH_3)CH_2$, $CH(C_4H_9)C(CH_3)_2$, $C(CH_3)_2$, $(CH_3)_2Si$, $(CH_3)_2Ge$, $(CH_3)_2Sn$, $(C_6H_5)_2Si$, $(C_6H_5(CH_3))Si$, $(C_6H_5)_2Ge$, $(C_6H_5)_2Sn$, $(CH2)_4Si$, $CH_2Si(CH_3)_2$, o-$C_6H_4$ or 2,2'-$(C_6H_4)_2$. It is also possible for Z together with one or more radicals $R^{10}$ and/or $R^{11}$ to form a monocyclic or polycyclic ring system.

Preference is given to chiral bridged metallocene compounds of the formula (V), in particular those in which v is 1 and one or both cyclopentadienyl rings are substituted in such a way that they form an indenyl ring. The indenyl ring is preferably substituted, in particular in the 2 position, 4 position, 2,4,5 positions, 2,4,6 positions, 2,4,7 positions or 2,4,5,6 positions, by $C_1$–$C_{20}$ groups such as $C_1$–$C_{10}$-alkyl or $C_6$–$C_{20}$-aryl, where two or more substituents of the indenyl ring may also together form a ring system.

Chiral bridged metallocene compounds of the formula (V) can be used as pure racemic or pure meso compounds. However, it is also possible to use mixtures of a racemic compound and a meso compound.

Examples of metallocene compounds are:

dimethylsilanediylbis(indenyl)zirconium dichloride dimethylsilanediylbis(4-naphthylindenyl)zirconium dichloride dimethylsilanediylbis(2-methylbenzoindenyl)zirconium dichloride dimethylsilanediylbis(2-methylindenyl)zirconium dichloride dimethylsilanediylbis(2-methyl-4-(1-naphthyl)indenyl) zirconium dichloride dimethylsilanediylbis(2-methyl-4-(2-naphthyl)indenyl) zirconium dichloride dimethylsilanediylbis(2-methyl-4-phenylindenyl)zirconium dichloride dimethylsilanediylbis(2-methyl-4-t-butylindenyl)zirconium dichloride dimethylsilanediylbis(2-methyl-4-isopropylindenyl) zirconium dichloride dimethylsilanediylbis(2-methyl-4-ethylindenyl)zirconium dichloride dimethylsilanediylbis(2-methyl-4-α-acenaphthindenyl) zirconium dichloride dimethylsilanediylbis(2,4-dimethylindenyl)zirconium dichloride dimethylsilanediylbis(2-ethylindenyl)zirconium dichloride dimethylsilanediylbis(2-ethyl-4-ethylindenyl)zirconium dichloride dimethylsilanediylbis(2-ethyl-4-phenylindenyl)zirconium dichloride dimethylsilanediylbis(2-methyl-4,5-benzoindenyl) zirconium dichloride dimethylsilanediylbis(2-methyl-4,6-diisopropylindenyl) zirconium dichloride dimethylsilanediylbis(2-methyl-4,5-diisopropylindenyl) zirconium dichloride dimethylsilanediylbis(2,4,6-trimethylindenyl)zirconium dichloride dimethylsilanediylbis(2,5,6-trimethylindenyl)zirconium dichloride
dimethylsilanediylbis(2,4,7-trimethylindenyl)zirconium dichloride
dimethylsilanediylbis(2-methyl-5-isobutylindenyl) zirconium dichloride
dimethylsilanediylbis(2-methyl-5-t-butylindenyl)zirconium dichloride
methyl(phenyl)silanediylbis(2-methyl-4-phenylindenyl) zirconium dichloride
methyl(phenyl)silanediylbis(2-methyl-4,6 diisopropylindenyl)zirconium dichloride
methyl(phenyl)silanediylbis(2-methyl-4-isopropylindenyl) zirconium dichloride
methyl(phenyl)silanediylbis(2-methyl-4,5-benzoindenyl) zirconium dichloride
methyl(phenyl)silanediylbis(2-methyl-4,5-(methylbenzo) indenyl)zirconium dichloride
methyl(phenyl)silanediylbis(2-methyl-4,5-(tetramethylbenzo)indenyl)zirconium dichloride
methyl(phenyl)silanediylbis(2-methyl-4-α-acenaphthindenyl)zirconium dichloride
methyl(phenyl)silanediylbis(2-methylindenyl)zirconium dichloride
methyl(phenyl)silanediylbis(2-methyl-5-isobutylindenyl) zirconium dichloride
1,2-ethanediylbis(2-methyl-4-phenylindenyl)zirconium dichloride
1,4-butanediylbis(2-methyl-4-phenylindenyl)zirconium dichloride
1,2-ethanediylbis(2-methyl-4,6 diisopropylindenyl) zirconium dichloride
1,4-butanediylbis(2-methyl-4-isopropylindenyl)zirconium dichloride
1,4-butanediylbis(2-methyl-4,5-benzoindenyl)zirconium dichloride
1,2-ethanediylbis(2-methyl-4,5-benzoindenyl)zirconium dichloride
1,2-ethanediylbis(2,4,7-trimethylindenyl)zirconium dichloride
1,2-ethanediylbis(2-methylindenyl)zirconium dichloride
1,4-butanediylbis(2-methylindenyl)zirconium dichloride
[4-($\eta^5$-cyclopentadienyl)-4,6,6-trimethyl-($\eta^5$-4,5-tetrahydropentalene)]dichlorozirconium
[4-($\eta^5$-3'-trimethylsilylcyclopentadienyl)-4,6,6-trimethyl-($\eta^5$-4,5-tetrahydropentalene)]dichlorozirconium
[4-($\eta^5$-3'-isopropylcyclopentadienyl) -4,6,6-trimethyl-($\eta^5$-4,5-tetrahydropentalene)]dichlorozirconium
[4-($\eta^5$-cyclopentadienyl)-4,7,7-trimethyl-($\eta^5$-4,5,6,7-tetrahydroindenyl)]dichlorotitanium
[4-($\eta^5$-cyclopentadienyl)-4,7,7-trimethyl-($\eta^5$-4,5,6,7-tetrahydroindenyl)]dichlorozirconium
[4-($\eta^5$-cyclopentadienyl)-4,7,7-trimethyl-($\eta^5$-4,5,6,7-tetrahydroindenyl)]dichlorohafnium
[4-($\eta^5$-3'-tert-butylcyclopentadienyl)4,7,7-trimethyl-($\eta^5$-4,5,6,7-tetrahydroindenyl)]dichlorotitanium
4-($\eta^5$-3'-isopropylcyclopentadienyl)-4,7,7-trimethyl-($\eta^5$-4,5,6,7-tetrahydroindenyl)]-dichlorotitanium
4-($\eta^5$-3'-methylcyclopentadienyl)-4,7,7-trimethyl-($\eta^5$-4,5,6,7-tetrahydroindenyl)]-dichlorotitanium
4-($\eta^5$-3'-trimethylsilylcyclopentadienyl)-2-trimethylsilyl-4,7,7-trimethyl-($\eta^5$-4,5,6,7-tetrahydroindenyl)] dichlorotitanium
4-($\eta^5$-3'-tert-butylcyclopentadienyl)-4,7,7-trimethyl-($\eta^5$-4,5,6,7-tetrahydroindenyl)]dichlorozirconium
(tert-butylamido)-(tetramethyl-$\eta^5$-cyclopentadienyl) dimethylsilyldichlorotitanium
(tert-butylamido)-(tetramethyl-$\eta^5$-cyclopentadienyl)-1,2-ethanediyldichlorotitanium
(methylamido)-(tetramethyl-$\eta^5$-cyclopentadienyl) dimethylsilyldichlorotitanium
(methylamido)-(tetramethyl-$\eta^5$-cyclopentadienyl)-1,2-ethanediyldichlorotitanium
(tert-butylamido)-(2,4-dimethyl-2,4-pentadien-1-yl) dimethylsilyl-dichlorotitanium
bis(cyclopentadienyl)zirconium dichloride
bis(n-butylcyclopentadienyl)zirconium dichloride
bis(1,3-dimethylcyclopentadienyl)zirconium dichloride
tetrachloro-[1[bis($\eta^5$-1H-inden-1-ylidene)methylsilyl]-3-$\eta^5$-cyclopenta-2,4-dien-1-ylidene)-3-$\eta^5$-9H-fluoren-9-ylidene)butane]dizirconium
tetrachloro-[2-[bis($\eta^5$-2-methyl-1H-inden-1-ylidene) methoxysilyl]-5-($\eta^5$-2,3,4,5-tetramethylcyclopenta-2,4-dien-1-ylidene)-5-($\eta^5$-9H-fluoren-9-ylidene)hexane]-dizirconium
tetrachloro-[1-[bis($\eta^5$-1H-inden-1-ylidene)methylsilyl]-6-($\eta^5$-cyclopenta-2,4-dien-1-ylidene)-6-($\eta^5$-9H-fluoren-9-ylidene)-3-oxaheptane]dizirconium
dimethylsilanediylbis(2-methyl-4-(tert-butylphenylindenyl) zirconium dichloride
dimethylsilanediylbis(2-methyl-4-(4-methylphenylindenyl) zirconium dichloride
dimethylsilanediylbis(2-methyl-4-(4-ethylphenylindenyl) zirconium dichloride
dimethylsilanediylbis(2-methyl-4-(4-trifluoromethylphenylindenyl)zirconium dichloride
dimethylsilanediylbis(2-methyl-4-(4-methoxyphenylindenyl)zirconium dichloride
dimethylsilanediylbis(2-ethyl-4-(4-tert-butylphenylindenyl) zirconium dichloride
dimethylsilanediylbis(2-ethyl-4-(4-methylphenylindenyl) zirconium dichloride
dimethylsilanediylbis(2-ethyl-4-(4-ethylphenylindenyl) zirconium dichloride
dimethylsilanediylbis(2-ethyl-4-(4-trifluoromethylphenylindenyl)zirconium dichloride
dimethylsilanediylbis(2-ethyl-4-(4-methoxyphenylindenyl) zirconium dichloride
dimethylsilanediylbis(2-methyl-4-(4-tert-butylphenylindenyl)dimethylzirconium
dimethylsilanediylbis(2-methyl-4-(4-methylphenylindenyl) dimethylzirconium
dimethylsilanediylbis(2-methyl-4-(4-ethylphenylindenyl) dimethylzirconium
dimethylsilanediylbis(2-methyl-4-(4-trifluoromethylphenylindenyl)dimethylzirconium
dimethylsilanediylbis(2-methyl-4-(4-methoxyphenylindenyl)dimethylzirconium
dimethylsilanediylbis(2-ethyl-4-(4-tert-butylphenylindenyl) dimethylzirconium
dimethylsilanediylbis(2-ethyl-4-(4-methylphenylindenyl) dimethylzirconium
dimethylsilanediylbis(2-ethyl-4-(4-ethylphenylindenyl) zirconium diethyl
dimethylsilanediylbis(2-ethyl-4-(4-trifluoromethylphenylindenyl)dimethylzirconium
dimethylsilanediylbis(2-ethyl-4-(4-methoxyphenylindenyl) dimethylzirconium The catalyst system of the present invention may further comprise an aluminum compound of the formula (VI)

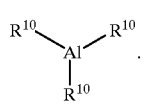
(VI)

The radicals $R^{10}$ in formula (VI) may be identical or different and are each a halogen atom, a hydrogen atom, a $C_1$–$C_{40}$ group, preferably $C_1$–$C_{20}$-alkyl, $C_1$–$C_{20}$-haloalkyl, $C_6$–$C_{20}$-aryl, $C_6$–$C_{20}$-haloaryl, $C_7$–$C_{40}$-arylalkyl, $C_7$–$C_{40}$-haloarylalkyl, $C_7$–$C_{40}$-alkylaryl or $C_7$–$C_{40}$-haloalkylaryl.

Preferred radicals $R^{10}$ are $C_1$–$C_6$-alkyl groups, particularly preferably $C_1$–$C_4$-alkyl groups.

The aluminum compound here can be the same as that used for preparing the cocatalytically active compound, but can also be different.

Preferred aluminum compounds are trimethylaluminum, triethylaluminum, triisopropylaluminum, trihexylaluminum, trioctylaluminum, tri-n-butylaluminum, tri-n-propylaluminum, triisoprenylaluminum, dimethylaluminum monochloride, diethylaluminum monochloride, diisobutylaluminum monochloride, methylaluminum sesquichloride, ethylaluminum sesquichloride, dimethylaluminum hydride, diethylaluminum hydride, diisopropylaluminum hydride, dimethylaluminum trimethylsiloxide, dimethylaluminum triethylsiloxide, phenylalane, pentafluorophenylalane or o-tolylalane.

Particular preference is given to trimethylaluminum, triethylaluminum and triisobutylaluminum.

The preparation of a chemical compound of the formula (I) to be used according to the present invention can proceed, for example, according to the following reaction scheme:

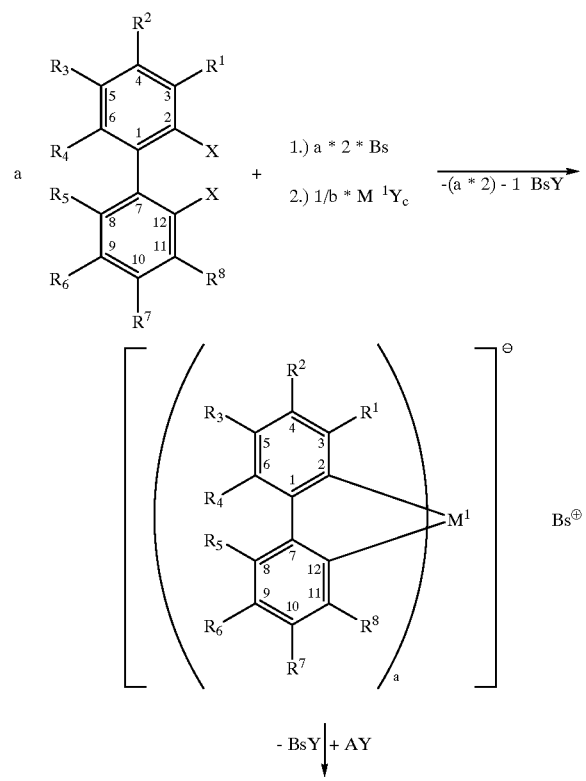

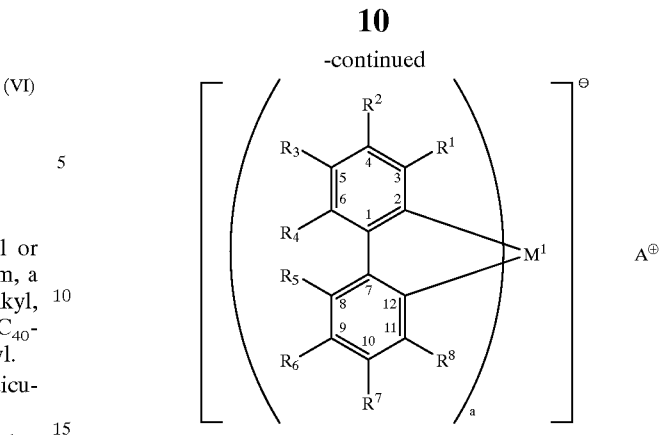

In this scheme,

Bs is a base, preferably an element of group Ia or IIa of the Periodic Table of the Elements or an organolithium compound or a Grignard compound, X are identical or different and are each a leaving group, preferably a hydrogen or halogen atom, Y are identical or different and are each a leaving group, preferably a hydrogen or halogen atom, $M^1$ is an element of group IIa, IIIa, IVa or Va of the Periodic Table of the Elements, A is a cation of group Ia, IIa, IIIa of the Periodic Table of the Elements, a carbenium, oxonium or sulfonium cation or a quaternary ammonium compound, a is 2 or 3, b is an integer from 2 to 5 and c is an integer from 2 to 5.

To prepare the catalyst system of the present invention, one or more metallocenes of the formula (V) can be reacted with one or more compounds of the formula (I) in any stoichiometric ratio. As solvents, use is made of aliphatic or aromatic solvents such as toluene, heptane, isododecane, tetrahydrofuran or diethyl ether. However, it is also possible to use solvent mixtures.

One possible procedure is to dissolve or suspend a chemical compound of the formula (V) in an aliphatic or aromatic solvent, and then to add one or more chemical compounds of the formula (I) either as such or in dissolved or suspended form. The reaction time is from 1 minute to 24 hours, preferably from 5 minutes to 120 minutes. The reaction temperature is from –10° C. to +200° C., preferably from 20° C. to 70° C. All starting materials can be used in any stoichiometric ratio. The stoichiometric ratio of compounds of the formula (V): compounds of the formula (I) is preferably in the range from 1:0.1 to 1:200. The stoichiometric ratio of compounds of the formula (V): compounds of the formula (I) is particularly preferably in the range from 1:1 to 1:20.

A further possible way of preparing the catalyst system of the present invention is to react one or more metallocenes of the formula (V) with one or more compounds of the formula (I) and one or more aluminum compounds of the formula (VI) in any stoichiometric ratio. As solvents, use is made of aliphatic or aromatic solvents such as toluene, heptane, tetrahydrofuran or diethyl ether. However, it is also possible to use solvent mixtures. One possible procedure is to dissolve or suspend one or more metallocenes of the formula (V) in an aliphatic or aromatic solvent, and then to add one or more compounds of the formula (I) either as such or in dissolved or suspended form. The reaction time is in the range from 1 minute to 24 hours, preferably from 5 minutes to 120 minutes. The reaction temperature is in the range from −10° C. to +200° C., preferably from 20° C. to 70° C. Subsequently, an aluminum compound of the formula (VI) is added in dissolved or suspended form. The reaction time is in the range from 1 minute to 24 hours, preferably from 5 minutes to 120 minutes. The reaction temperature is in the range from −10° C. to +200° C., preferably from 20° C. to 70° C. All starting materials can be used in any stoichiometric ratio. The stoichiometric ratio of metallocenes of the formula V:compounds (I) is preferably in the range from 1:0.1 to 1:200 and that of metallocenes of the formula (V): aluminum compounds of the formula (VI) is preferably in the range from 1:0.01 to 1:400. The stoichiometric ratio of metallocenes of the formula (V): compound (I) is particularly preferably in the range from 1:1 to 1:20 and that of metallocenes of the formula (V): aluminum compounds of the formula (VI) is particularly preferably in the range from 1:1 to 1:10. The order of addition of the individual components can, however, be changed at will, so that, for example, an aluminum compound of the formula (VI) is particularly preferably added first, one or more metallocenes of the formula (V are subsequently added and one or more compounds of the formula (I) are then added. The catalyst system obtained can be injected directly into the polymerization autoclave.

The catalyst systems of the present invention comprise at least one support. Examples of such supports are inorganic oxides such as silicon oxide, aluminum oxide, zeolites, MgO, $ZrO_2$, $TiO_2$, $B_2O_3$, CaO, ZnO, $ThO_2$, $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ or $Li_2O$, in particular silicon oxide and/or aluminium oxide. The support can also comprise at least one polymer, e.g. a homopolymer or copolymer, a crosslinked polymer or a polymer blend. Examples of polymers are polyethylene, polypropylene, polybutene, polystyrene, divinylbenzene-crosslinked polystyrene, polyvinyl chloride, acryl-butadiene-styrene copolymer, polyamide, polymethacrylate, polycarbonate, polyester, polyacetal and polyvinyl alcohol.

The support has a specific surface area in the range from 10 to 1000 m²/g, preferably from to 150 to 500 m²/g. The mean particle size of the support is from 1 to 500 µm, preferably from 5 to 350 µm, particularly preferably from 10 to 200 µm.

The support is preferably porous with a pore volume of from 0.5 to 4.0 ml/g, preferably from 1.0 to 3.5 ml/g. A porous support has a certain proportion of voids (pore volume). The shape of the pores is usually irregular, frequently spherical. The pores can be connected to one another by means of small pore openings. The pore diameter is preferably from about 2 to 50 nm. The particle shape of the porous support is dependent on the after-treatment and can be irregular or spherical. The particle size of the support can be adjusted to any desired value, for example by cryogenic milling and/or sieving.

In addition, the support material can have been pretreated with an aluminum compound. The aluminum compound of the formula (VI) can be the same as that used for preparing the catalyst system, but can also be different. Furthermore, the support material can also have been pretreated with other chemical compounds such as trimethylchlorosilane, tetrachlorosilane, boron trichloride, amines such as phenyldimethylamine, pyridine, N,N-dimethylaniline, mercaptans such as mercaptopropylmethyldimethoxysilane, benzyl chloride, phenylmethyl chloride or tosylates.

The catalyst system of the present invention can be brought into contact with the support in any possible combination.

One possible variant is to prepare the catalyst system in solution and subsequently to react this with the support. For this purpose, one or more metallocenes of the formula (V) are dissolved or suspended in an aliphatic or aromatic solvent such as toluene, heptane, cyclohexane, isododecane or tetrahydrofuran. Subsequently, one or more compounds of the formula (I) are added either as such or in dissolved or suspended form. The reaction time is in the range from 1 minute to 24 hours, preferably from 5 minutes to 120 minutes. The reaction temperature is in the range from −1020 C. to +200° C., preferably from 20° C. to 70° C. This is followed by addition of an aluminum compound of the formula (VI). Here too, the reaction time is in the range from 1 minute to 24 hours, preferably from 5 minutes to 120 minutes. The reaction temperature is in the range from −10° C. to +200° C., preferably from 20° C. to 70° C. All starting materials can be used in any stoichiometric ratio. The stoichiometric ratio of metallocenes of the formula (V): compounds (I) is preferably in the range from 1:0.1 to 1:200 and that of metallocenes of the formula (V): aluminum compounds of the formula (VI) is preferably in the range from 1:0.01 to 1:400. The stoichiometric ratio of metallocenes of the formula (V): compounds (I) is particularly preferably in the range from 1:1 to 1:20 and that of metallocenes of the formula (V): aluminum compounds of the formula (VI) is particularly preferably in the range from 1:1 to 1:10. The order of addition of the individual compounds can, however, be varied at will, so that, for example, an aluminum compound of the formula (VI) is added first, one or more metallocenes of the formula (V) are subsequently added and one or more compounds of the formula (I) are then added. The catalyst system is subsequently added as a solution to the support material. Here, the support material can have been suspended in a solvent or can be placed in the reaction vessel as a powder.

The supported catalyst system can be used directly for the polymerization. However, it is also possible to remove the solvent and then to resuspend the catalyst system for use in the polymerization.

Preference is given to polymerizing olefins of the formula $R^\alpha$—CH=CH—$R^\beta$, where $R^\alpha$ and $R^\beta$ are identical or different and are each a hydrogen atom, a halogen atom, an alkoxy, hydroxy, alkylhydroxy, aldehyde, carboxyl or carboxylic ester group or a saturated or unsaturated hydrocarbon radical having from 1 to 20 carbon atoms, in particular from 1 to 10 carbon atoms, which may be substituted by an alkoxy, hydroxy, alkylhydroxy, aldehyde, carboxyl or carboxylic ester group, or $R^\alpha$ and $R^\beta$ together with the atoms connecting them form one or more rings. Examples of such olefins are 1-olefins such as ethylene, propylene, 1-butene, 1-hexene, 4-methyl-1-pentene, 1-octene or styrene, cyclic olefins such as norbornene, vinylnorbornene, tetracyclododecene or ethylidenenorbornene, dienes such as 1,3-butadiene or 1,4-hexadiene, biscyclopentadiene and methyl methacrylate.

Particular preference is given to homopolymerizing propylene or ethylene, copolymerizing ethylene with one or more $C_3$–$C_{20}$-1-olefins, in particular propylene, and/or one or more $C_4$–$C_{20}$-dienes, in particular 1,3-butadiene, or copolymerizing norbornene and ethylene.

The polymerization is preferably carried out at from −60 to 300° C., particularly preferably from 30 to 250° C. The pressure is from 0.5 to 2500 bar, preferably from 2 to 1500 bar. The polymerization can be carried out continuously or batchwise, in one or more stages, in solution, in suspension, in the gas phase or in a supercritical medium.

The supported catalyst system can be resuspended as powder or while still moist with solvent and metered as suspension in an inert suspension medium into the polymerization system.

A prepolymerization can be carried out by means of the catalyst system of the present invention. The prepolymerization is preferably carried out using the (or one of the) olefin(s) used in the polymerization.

To prepare olefin polymers having a broad molecular weight distribution, preference is given to using catalyst systems comprising two or more different transition metal compounds, e.g. metallocenes.

To remove any catalyst poisons present in the olefin, purification using an aluminum alkyl, for example trimethylaluminum, triethylaluminum or triisobutylaluminum, is advantageous. This purification can either be carried out in the polymerization system itself or the olefin is brought into contact with the Al compound and subsequently separated off again prior to introduction into the polymerization system.

As molar mass regulator and/or to increase the activity, hydrogen is added if necessary. The total pressure in the polymerization system is from 0.5 to 2500 bar, preferably from 2 to 1500 bar.

The compound used according to the present invention is employed in a concentration, based on the transition metal, of preferably from $10^{-3}$ to $10^{-8}$ mol, preferably from $10^{-4}$ to $10^{-7}$ mol, of transition metal per $dm^3$ of solvent or per $dm^3$ of reactor volume.

Suitable solvents for preparing both the supported chemical compound of the present invention and the catalyst system of the present invention are aliphatic or aromatic solvents, for example hexane or toluene, ether solvents, for example tetrahydrofuran or diethyl ether, or halogenated hydrocarbons, for example methylene chloride or halogenated aromatic hydrocarbons such as o-dichlorobenzene.

Before addition of the catalyst system comprising at least one supported chemical compound according to the present invention and at least one transition metal compound (such as a metallocene), it is also possible to introduce another alkylaluminum compound such as trimethylaluminum, triethylaluminum, triisobutylaluminum, trioctylaluminum or isoprenylaluminum into the reactor to make the polymerization system inert (for example to remove any catalyst poisons present in the olefin). This additional aluminum compound is added to the polymerization system in a concentration of from 100 to 0.01 mmol of Al per kg of reactor contents. Preference is given to using triisobutylaluminum and triethylaluminum in a concentration of from 10 to 0.1 mmol of Al per kg of reactor contents. This makes it possible to choose a small Al/M molar ratio in the synthesis of a supported catalyst system.

Furthermore, the process of the present invention can be carried out using an additive such as an antistatic, for example for improving the particle morphology of the olefin polymer. In general, all antistatics which are suitable for polymerization can be used. Examples are salt mixtures of calcium salts of Medialan acid and chromium salts of N-stearylanthranilic acid, which are described in DE-A-3,543,360. Further suitable antistatics are, for example, $C_{12}$–$C_{22}$-fatty acid soaps of alkali metals or alkaline earth metals, salts of sulfonic acid esters, esters of polyethylene glycols with fatty acids, polyoxyethylene alkyl ethers, etc. An overview of antistatics is given in EP-A-0,107,127.

A further antistatic which can be used is a mixture of a metal salt of Medialan acid, a metal salt of anthranilic acid and a polyamine, as described in EP-A-0,636,636.

It is likewise possible to use commercially available products such as Stadis® 450 from DuPont, namely a mixture of toluene, isopropanol, dodecylbenzenesulfonic acid, a polyamine, a copolymer of 1-decene and $SO_2$ and also 1-decene, or ASA®-3 from Shell and ARU5R® 163 from ICI.

The antistatic is preferably used as a solution; in the preferred case of Stadis® 450, preference is given to using from 1 to 50% by weight of this solution, preferably from 5 to 25% by weight, based on the mass of the supported catalyst used (support together with covalently bound metallocenium-forming compound and one or more metallocene compounds, e.g. of the formula IV). However, the necessary amounts of antistatic can fluctuate within a wide range, depending on the type of antistatic used.

The actual polymerization is preferably carried out in the liquid monomer (bulk) or in the gas phase.

The antistatic can be introduced into the polymerization at any point in time. For example, a preferred procedure is to resuspend the supported catalyst system in an organic solvent, preferably an alkane such as heptane or isododecane, and then to introduce it into the polymerization autoclave while stirring. The antistatic is then metered in. The polymerization is carried out at from 0 to 100° C. A further preferred procedure is to meter the antistatic into the polymerization autoclave before addition of the supported catalyst system, and then to meter in the resuspended supported catalyst system while stirring at from 0 to 100° C. The polymerization time can be from 0.1 to 24 hours. Preference is given to a polymerization time in the range from 0.1 to 5 hours.

In the above-described process, no deposits are formed in the reactor, no agglomerates are formed and the productivity of the catalyst system used is high. The polymers prepared by the process of the present invention have a narrow molecular weight distribution and good particle morphology.

The following examples serve to illustrate the invention.

General information: Preparation and handling of the compounds were carried out under argon with exclusion of air and moisture (Schlenk technique). All solvents required were dried before use by boiling for a number of hours over suitable desiccants and subsequent distillation under argon.

EXAMPLE 1

Synthesis of 2,2'-dibromooctafluorobiphenyl 10 g of 1,2-dibromotetrafluorobenzene (32 mmol) and 100 ml of diethyl ether are placed in a reaction vessel and cooled to −78° C. 15 ml of n-butyllithium (2.5 M in hexane) are added dropwise and the mixture is stirred for 1 hour. An excess of titanium tetrachloride is subsequently added and the mixture is stirred for another 4 hours at −78° C. The suspension is allowed to warm to room temperature and is stirred for another 10 hours. It is then hydrolyzed with $H_2O$. The aqueous phase is shaken a number of times with diethyl ether and the organic phases are subsequently combined and dried over magnesium sulfate. The solvent is taken off and the residue is recrystallized from a 1:1 mixture of diethyl ether/n-pentane.

$^{19}$F-NMR $CDCl_3$: −127.5 ppm (m, 2F, 3,3'-F), −134.6 ppm (m, 2F, 6,6'-F), −149.9 ppm (m, 2F, 4,4'-F), −154.3 ppm (m, 2F, 5,5'-F)

EXAMPLE 2

Synthesis of N,N-dimethylanilinium bis(2,2'-octafluorobiphenyl)borate 4.6 g (10 mmol) of 2,2'-dibromooctafluorobiphenyl and 30 ml of diethyl ether are placed in a reaction vessel and stirred at −78° C. 8 ml of n-butyllithium (2 M in hexane) are subsequently added dropwise and the suspension is stirred for 2 hours at −78° C. 5 ml of boron trichloride (1M in hexane) are then added dropwise and the suspension is warmed to room temperature. The solvent is taken off under reduced pressure and the residue is stirred out with 100 ml of pentane. Subsequently, 0.79 g of N,N-dimethylanilinium chloride is added a little at a time and the mixture is stirred for another 5 hours. The solid obtained is filtered off and extracted with 50 ml of methylene chloride. The filtrate obtained is evaporated under reduced pressure and the resulting solid is recrystallized from a methylene chloride/pentane mixture (1:1).

$^{19}$F-NMR CDCl$_3$: −137.2 ppm (m, 2F, 3,3'-F), −138.4 ppm (m, 2F, 6,6'-F), −159.9 ppm (m, 2F, 4,4'-F), −160.9 ppm (m, 2F, 5,5'-F)

EXAMPLE 3

Synthesis of triphenylcarbenium bis(2,2'-octafluorobiphenyl)borate 4.6 g (10 mmol) of 2,2'-dibromooctafluorobiphenyl and 30 ml of diethyl ether are placed in a reaction vessel and stirred at −78° C. 8 ml of n-butyllithium (2 M in hexane) are subsequently added dropwise and the suspension is stirred for 2 hours at −78° C. 5 ml of boron trichloride (1 M in hexane) are then added dropwise and the suspension is warmed to room temperature. The solvent is taken off under reduced pressure and the residue is stirred out with 100 ml of pentane. Subsequently, 1.39 g of triphenylchloromethane are added a little at a time and the mixture is stirred for another 10 hours. The solid obtained is filtered off and extracted with 70 ml of methylene chloride. The filtrate obtained is evaporated under reduced pressure and the resulting solid is recrystallized from a methylene chloride/pentane mixture (1:1).

$^{19}$F-NMR CDCl$_3$: −137.4 ppm (m, 2F, 3,3'-F), −138.8 ppm (m, 2F, 6,6'-F), −160.4 ppm (m, 2F, 4,4'-F), −161.3 ppm (m, 2F, 5,5'-F)

EXAMPLE 4

Synthesis of triphenylcarbenium tris(2,2'-octafluorobiphenyl)phosphate 5.93 g (12 mmol) of 2,2'-dibromooctafluorobiphenyl and 30 ml of diethyl ether are placed in a reaction vessel and stirred at −78° C. 9.6 ml of n-butyllithium (2.5 M in hexane) are subsequently added dropwise and the suspension is stirred for 2 hours at −78° C. 0.83 g of PCl$_5$ dissolved in 10 ml of Et$_2$O is then added dropwise and the suspension is warmed to room temperature. The solvent is taken off under reduced pressure and the residue is stirred out with 100 ml of pentane. Subsequently, 1.10 g of triphenylchloromethane are added a little at a time and the mixture is stirred for another 10 hours. The solid obtained is filtered off and extracted with 70 ml of methylene chloride. The filtrate obtained is evaporated under reduced pressure and the resulting solid is recrystallized from a methylene chloride/pentane mixture (1:1).

$^{19}$F-NMR CDCl$_3$: −133.9 ppm (m, 2F, 3,3'-F), −134.4 ppm (m, 2F, 6,6'-F), −157.4 ppm (m, 2F, 4,4'-F), −158.5 ppm (m, 2F, 5,5'-F)

EXAMPLE 5

Synthesis of N,N-dimethylanilinium tris(2,2'-octafluorobiphenyl)phosphate 5.93 g (12 mmol) of 2,2'-dibromooctafluorobiphenyl and 30 ml of diethyl ether are placed in a reaction vessel and stirred at −78° C. 9.6 ml of n-butyllithium (2.5 M in hexane) are subsequently added dropwise and the suspension is stirred for 2 hours at −78° C. 0.83 g of PCl$_5$ dissolved in 10 ml of Et$_2$O is then added dropwise and the suspension is warmed to room temperature. The solvent is taken off under reduced pressure and the residue is stirred out with 100 ml of pentane. Subsequently, 0.63 g of N,N-dimethylanilinium chloride is added a little at a time and the mixture is stirred for another 5 hours. The solid obtained is filtered off and extracted with 70 ml of methylene chloride. The filtrate obtained is evaporated under reduced pressure and the resulting solid is recrystallized from a methylene chloride/pentane mixture (1:1).

$^{19}$F-NMR CDCl$_3$: −133.1 ppm (m, 2F, 3,3'-F), −133.6 ppm (m, 2F, 6,6'-F), −157.0 ppm (m, 2F, 4,4'-F), −158.1 ppm (m, 2F, 5,5'-F)

EXAMPLE 6

Passivation of the Support Material 3 g of SiO$_2$ (XPO 2407, dried at 140° C. and 10 mbar) are suspended in 20 ml of heptane, and 26 ml of TIBA (20% strength in Varsol) are slowly added. The mixture is stirred for 1 hour at room temperature and the solid is subsequently filtered off from the solvent. The residue is washed with 2×40 ml of pentane and then dried at room temperature in an oil pump vacuum. This gives 3.3 g of a passivated support material.

EXAMPLE 7

Preparation of the Supported Catalyst System 1

7.3 mg of N,N-dimethylanilinium bis(2,2'-octafluorobiphenyl)borate are added to 5.9 mg of dimethylsilanediylbis(2-methyl-4-phenylindenyl)dimethylzirconium in 2 ml of toluene and the mixture is stirred for 15 minutes. The resulting red solution is slowly added to 1 g of passivated SiO$_2$ (from Example 6) suspended in 20 ml of toluene. The suspension is stirred for 1 hour at room temperature and the solvent is subsequently taken off in an oil pump vacuum. The resulting solid is dried to constant weight.

EXAMPLE 8

Preparation of the Supported Catalyst System 2

6.1 mg of dimethylsilanediylbis(2-methyl-4-phenylindenyl)zirconium dichloride in 2 ml of toluene are stirred with 0.015 ml of trimethylaluminum (2 M in toluene) for 30 minutes and then admixed with 7.3 mg of N,N-dimethylanilinum bis(2,2'-octafluorobiphenyl)borate. The resulting red solution is slowly added to 1 g of passivated SiO$_2$ (from Example 6) suspended in 20 ml of toluene. The suspension is stirred for 1 hour at room temperature and the solvent is subsequently taken off in an oil pump vacuum. The resulting solid is dried to constant weight.

EXAMPLE 9

Preparation of the Supported Catalyst System 3

8.5 mg of dimethylsilanediylbis(2-methyl-4-phenylindenyl)zirconium dichloride in 2 ml of toluene are admixed with 2.8 ml of triisobutylaluminum (1M in toluene) and 10 mg of N,N-dimethylanilinium bis(2,2'-octafluorobiphenyl)borate and the mixture is then stirred for 20 minutes. The solution obtained is slowly added to 1 g of passivated SiO₂ (from Example 6) suspended in 20 ml of toluene. The suspension is stirred for 1 hour at 70° C. and the solvent is subsequently taken off in an oil pump vacuum. The resulting solid is dried to constant weight.

EXAMPLE 10

Preparation of the Supported Catalyst System 4

10.4 mg of N,N-dimethylanilinium tris(2,2'-octafluorobiphenyl)phosphate are added to 5.9 mg of dimethylsilanediylbis(2-methyl-4-phenylindenyl)dimethylzirconium in 2 ml of toluene and the mixture is stirred for 15 minutes. The resulting red solution is slowly added to 1 g of passivated SiO₂ (from Example 6) suspended in 20 ml of toluene. The suspension is stirred for 1 hour at room temperature and the solvent is subsequently taken off in an oil pump vacuum. The resulting solid is dried to constant weight.
Polymerization

EXAMPLE 11

Polymerization Using the Catalyst System 1

A dry 2 l reactor is flushed first with nitrogen and then with propylene and charged with 1.5 l of liquid propylene. 3 ml of TIBA (20% strength in Varsol) are added and the mixture is stirred for 15 minutes. The catalyst prepared in Example 7 resuspended in 20 ml of heptane is subsequently injected and rinsed again with 15 ml of heptane. The reaction mixture is heated to the polymerization temperature of 60° C. and polymerization is carried out for 1 hour. The polymerization is stopped by venting the remaining propylene. The polymer is dried in a vacuum drying oven. This gives 214 g of polypropylene powder. The reactor displayed no deposits on the inner wall or the stirrer. The catalyst activity is 37 kg of PP/g of metallocene×h.

EXAMPLE 12

Polymerization Using the Catalyst System 2

A dry 2 l reactor is flushed first with nitrogen and then with propylene and charged with 1.5 l of liquid propylene. 3 ml of TIBA (20% strength in Varsol) are added and the mixture is stirred for 15 minutes. The catalyst prepared in Example 8 resuspended in 20 ml of heptane is subsequently injected and rinsed again with 15 ml of heptane. The reaction mixture is heated to the polymerization temperature of 60° C. and polymerization is carried out for 1 hour. The polymerization is stopped by venting the remaining propylene. The polymer is dried in a vacuum drying oven. This gives 290 g of polypropylene powder. The reactor displayed no deposits on the inner wall or the stirrer. The catalyst activity is 48 kg of PP/g of metallocene×h.

EXAMPLE 13

Polymerization Using the Catalyst System 3

A dry 2 l reactor is flushed first with nitrogen and then with propylene and charged with 1.5 l of liquid propylene. 3 ml of TIBA (20% strength in Varsol) are added and the mixture is stirred for 15 minutes. The catalyst prepared in Example 9 resuspended in 20 ml of heptane is subsequently injected and rinsed again with 15 ml of heptane. The reaction mixture is heated to the polymerization temperature of 60° C. and polymerization is carried out for 1 hour. The polymerization is stopped by venting the remaining propylene. The polymer is dried in a vacuum drying oven. This gives 354 g of polypropylene powder. The reactor displayed no deposits on the inner wall or the stirrer. The catalyst activity is 42 kg of PP/g of metallocene×h.

EXAMPLE 14

Polymerization Using the Catalyst System 1

A dry 2 l reactor is flushed first with nitrogen and then with propylene and charged with 1.5 l of liquid propylene. 3 ml of TIBA (20% strength in Varsol) are added and the mixture is stirred for 15 minutes. The catalyst prepared in Example 10 resuspended in 20 ml of heptane is subsequently injected and rinsed again with 15 ml of heptane. The reaction mixture is heated to the polymerization temperature of 60° C. and polymerization is carried out for 1 hour. The polymerization is stopped by venting the remaining propylene. The polymer is dried in a vacuum drying oven. This gives 180 g of polypropylene powder. The reactor displayed no deposits on the inner wall or the stirrer. The catalyst activity is 31 kg of PP/g of metallocene×h.

We claim:
1. A catalyst system comprising
a) at least one support,
b) at least one metallocene and
c) at least one compound of the formula (I)

(I)

where
M¹ is an element of group IIa, IIIa, IVa or Va of the Periodic Table of the Elements,
x is 0 or 1,
y is 0 or 1,
z is 0 or 1,
A is a cation of group Ia, IIa, IIIa of the Periodic Table of the Elements, a carbenium, oxonium, phosphonium or sulfonium cation or a quaternary ammonium compound,
Q¹, Q², Q³ are each a ligand system based on a biphenyl framework bounded to M¹ via the positions 2 and 12 and having the formula (II)

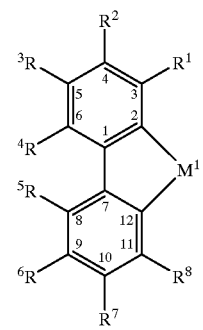

(II)

where
R¹, R², R³, R⁴, R⁵, R⁶, R⁷ and R⁸ are identical or different and are each a hydrogen atom, a halogen atom, a C₁–C₄₀ group, or an OSiR₃⁹ group, where R⁹ are identical or different and are each a hydrogen atom, a halogen atom, a C₁–C₄₀ group and two or more radicals $R^1$ to $R^8$ may be joined to one another so as to form a monocyclic or polycyclic ring system which may be substituted.

2. A catalyst system as claimed in claim 1, wherein, in formula (II), $R^1$, $R^2$, $R^3$, $R^4$, $R^5$, $R^6$, $R^7$ and $R^8$ are identical or different and are each $C_1$–$C_{20}$-alkyl, $C_1$–$C_{20}$-haloalkyl, $C_1$–$C_{10}$-alkoxy, $C_6$–$C_{40}$-aryl, $C_6$–$C_{40}$-haloaryl, $C_6$–$C_{40}$-aryloxy, $C_7$–$C_{40}$-arylalkyl, $C_7$–$C_{40}$-haloarylalkyl, $C_7$–$C_{40}$-haloalkylaryl or an $OSiR_3^9$ group, where $R^9$ are identical or different and are each $C_1$–$C_{20}$-alkyl, $C_1$–$C_{20}$-haloalkyl, $C_1$–$C_{10}$-alkoxy, $C_6$–$C_{40}$-aryl, $C_6$–$C_{40}$-haloaryl, $C_6$–$C_{40}$-aryloxy, $C_7$–$C_{40}$-arylalkyl, $C_7$–$C_{40}$-haloarylalkyl or $C_7$–$C_{40}$-haloalkylaryl.

3. A catalyst system as claimed in claim 1, wherein, in formula (I), $M^1$ is boron and z is zero.

4. A catalyst system as claimed in claim 1, wherein, in formula (II), $M^1$ is phosphorus.

5. A catalyst system as claimed in claim 1, wherein the formula (I) represents one of the following compounds:

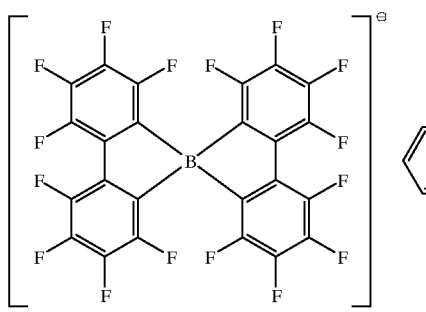 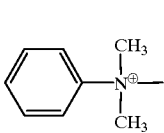

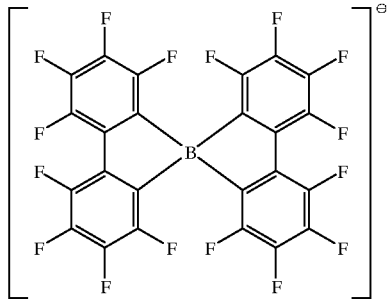 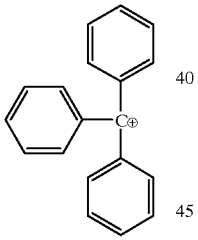

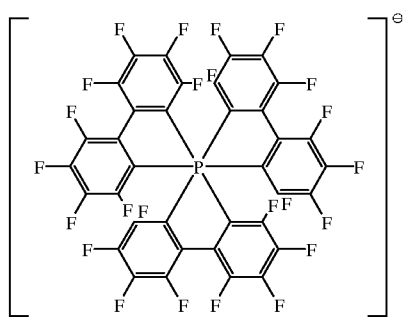 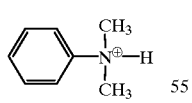

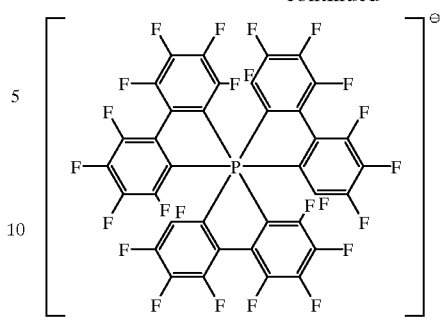 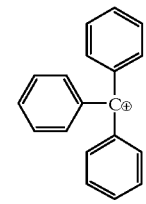

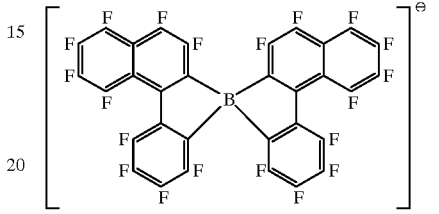 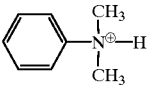

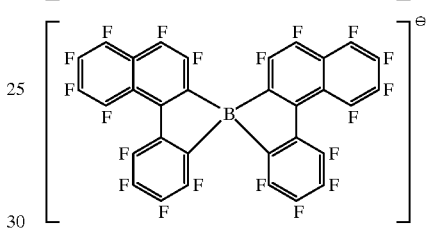 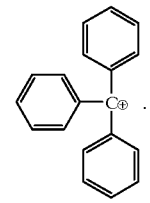

6. A catalyst system as claimed claim 1, wherein the metallocene used is a compound of the formula (V)

(V)

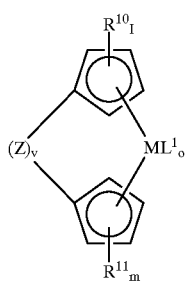

where
M is a metal of transition group III, IV, V or VI of the Periodic Table of the Elements, in particular Ti, Zr or Hf, $R^{10}$ are identical or different and are each a hydrogen atom or $SiR_3^{12}$, where $R^{12}$ are identical or different and are each a hydrogen atom or a $C_1$–$C_{40}$ group, or $R^{10}$ is a $C_1$–$C_{30}$ group or two or more radicals $R^{10}$ may be joined to one another in such a way that the radicals $R^{10}$ and the atoms of the cyclopentadienyl ring which connect them form a $C_4$–$C_{24}$ ring system which may in turn be substituted, $R^{11}$ are identical or different and are each a hydrogen atom or $SiR_3^{12}$, where $R^{12}$ are identical or different and are each a hydrogen atom or a $C_1$–$C_{40}$ group, or $R^{11}$ is a $C_1$–$C_{30}$ group or two or more radicals $R^{11}$ may be joined to one another in such a way that the radicals $R^{11}$ and the atoms of the cyclopentadienyl ring which connect them form a $C_4$–$C_{24}$ ring system which may in turn be substituted, l is 5 when v=0, and l is 4 when v=1, m is 5 when v=0, and m is 4 when v=1, $L^1$ may be identical or different and are each a hydrogen atom, a $C_1$–$C_{10}$-hydrocarbon group, a halogen atom, $OR^{16}$, $SR^{16}$, $OSiR_3^{16}$, $SiR_3^{16}$, $PR_2^{16}$ or $NR_2^{16}$, where $R^{16}$ is a halogen atom, a $C_1$–$C_{10}$-alkyl group, a halogenated $C_1$–$C_{10}$-alkyl group, a $C_6$–$C_{20}$-aryl group or a halogenated $C_6$–$C_{20}$-aryl group, or $L^1$ are each a toluenesulfonyl, trifluoroacetyl, trifluoroacetoxyl, trifluoromethanesulfonyl, nonafluorobutanesulfonyl or 2,2,2-trifluoroethanesulfonyl group, o is an integer from 1 to 4, Z is a bridging structural element between the two cyclopentadienyl rings and v is 0 or 1.

7. A catalyst system as claimed in claim 6, wherein Z in formula (V) is $M^2R^{13}R^{14}$, where $M^2$ is carbon, silicon, germanium or tin, $R^{13}$ and $R^{14}$ are identical or different and are each a $C_1$–$C_{20}$-hydrocarbon-containing group or trimethylsilyl.

8. A catalyst system as claimed in claim 6, wherein Z in formula (V) is $CH_2$, $CH_2CH_2$, $CH(CH_3)CH_2$, $CH(C_4H_9)C(CH_3)_2$, $C(CH_3)_2$, $(CH_3)_2Si$, $(CH_3)_2Ge$, $(CH_3)_2Sn$, $(C_6H_5)_2Si$, $(C_6H_5)(CH_3)Si$, $(C_6H_5)_2Ge$, $(C_6H_5)_2Sn$, $(CH_2)_4Si$, $CH_2Si(CH_3)_2$, o-$C_6H_4$ or 2,2'-$(C_6H_4)_2$.

9. A catalyst system as claimed in claim 6, wherein the metallocene of the formula (V) which is used is one of the compounds dimethylsilanediylbis(indenyl)zirconium dichloride
dimethylsilanediylbis(4-naphthylindenyl)zirconium dichloride
dimethylsilanediylbis(2-methylbenzoindenyl)zirconium dichloride
dimethylsilanediylbis(2-methylindenyl)zirconium dichloride
dimethylsilanediylbis(2-methyl-4-(1-naphthyl)indenyl)zirconium dichloride
dimethylsilanediylbis(2-methyl-4-(2-naphthyl)indenyl)zirconium dichloride
dimethylsilanediylbis(2-methyl-4-phenylindenyl)zirconium dichloride
dimethylsilanediylbis(2-methyl-4-t-butylindenyl)zirconium dichloride
dimethylsilanediylbis(2-methyl-4-isopropylindenyl)zirconium dichloride
dimethylsilanediylbis(2-methyl-4-ethylindenyl)zirconium dichloride
dimethylsilanediylbis(2-methyl-4-α-acenaphthindenyl)zirconium dichloride
dimethylsilanediylbis(2,4-dimethylindenyl)zirconium dichloride
dimethylsilanediylbis(2-ethylindenyl)zirconium dichloride
dimethylsilanediylbis(2-ethyl-4-ethylindenyl)zirconium dichloride
dimethylsilanediylbis(2-ethyl-4-phenylindenyl)zirconium dichloride
dimethylsilanediylbis(2-methyl-4,5-benzoindenyl)zirconium dichloride
dimethylsilanediylbis(2-methyl-4,6-diisopropylindenyl)zirconium dichloride
dimethylsilanediylbis(2-methyl-4,5-diisopropylindenyl)zirconium dichloride
dimethylsilanediylbis(2,4,6-trimethylindenyl)zirconium dichloride
dimethylsilanediylbis(2,5,6-trimethylindenyl) zirconium dichloride
dimethylsilanediylbis(2,4,7-trimethylindenyl)zirconium dichloride
dimethylsilanediylbis(2-methyl-5-isobutylindenyl) zirconium dichloride
dimethylsilanediylbis(2-methyl-5-t-butylindenyl)zirconium dichloride
methyl(phenyl)silanediylbis(2-methyl-4-phenylindenyl) zirconium dichloride
methyl(phenyl)silanediylbis(2-methyl-4,6-diisopropylindenyl)zirconium dichloride
methyl(phenyl)silanediylbis(2-methyl-4-isopropylindenyl) zirconium dichloride
methyl(phenyl)silanediylbis(2-methyl-4,5-benzoindenyl) zirconium dichloride
methyl(phenyl)silanediylbis(2-methyl-4,5-(methylbenzo)indenyl)zirconium dichloride
methyl(phenyl)silanediylbis(2-methyl-4,5-(tetramethylbenzo)indenyl)zirconium dichloride
methyl(phenyl)silanediylbis(2-methyl-4-α-acenaphthindenyl)zirconium dichloride
methyl(phenyl)silanediylbis(2-methylindenyl)zirconium dichloride
methyl(phenyl)silanediylbis(2-methyl-5-isobutylindenyl) zirconium dichloride
1,2-ethanediylbis(2-methyl-4-phenylindenyl)zirconium dichloride
1,4-butanediylbis(2-methyl-4-phenylindenyl)zirconium dichloride
1,2-ethanediylbis(2-methyl-4,6 diisopropylindenyl) zirconium dichloride
1,4-butanediylbis(2-methyl-4-isopropylindenyl)zirconium dichloride
1,4-butanediylbis(2-methyl-4,5-benzoindenyl)zirconium dichloride
1,2-ethanediylbis(2-methyl-4,5-benzoindenyl)zirconium dichloride
1,2-ethanediylbis(2,4,7-trimethylindenyl)zirconium dichloride
1,2-ethanediylbis(2-methylindenyl)zirconium dichloride
1,4-butanediylbis(2-methylindenyl)zirconium dichloride
[4-($\eta^5$-cyclopentadienyl)4,6,6-trimethyl-($\eta^5$-4,5-tetrahydropentalene)]dichlorozirconium
[4-($\eta^5$-3'-trimethylsilylcyclopentadienyl)4,6,6-trimethyl-($\eta^5$-4,5-tetrahydropentalene)]dichlorozirconium
[4-($\eta^5$-3'-isopropylcyclopentadienyl)4,6,6-trimethyl-($\eta^5$-4,5-tetrahydropentalene)]dichlorozirconium
[4-($\eta^5$-cyclopentadienyl)-4,7,7-trimethyl-($\eta_5$-4,5,6,7-tetrahydroindenyl)]dichlorotitanium
[4-($\eta^5$-cyclopentadienyl)-4,7,7-trimethyl-($\eta^5$-4,5,6,7-tetrahydroindenyl)]dichlorozirconium
[4-($\eta^5$-cyclopentadienyl)-4,7,7-trimethyl-($\eta^5$-4,5,6,7-tetrahydroindenyl)]dichlorohafnium
[4-($\eta^5$-3'-tert-butylcyclopentadienyl)-4,7,7-trimethyl-($\eta^5$-4,5,6,7-tetrahydroindenyl)]dichlorotitanium
[4-($\eta^5$-3'-isopropylcyclopentadienyl)-4,7,7-trimethyl-($\eta^5$-4,5,6,7-tetrahydroindenyl)]dichlorotitanium
4-($\eta^5$-3'-methylcyclopentadienyl)4,7,7-trimethyl-($\eta^5$-4,5,6,7-tetrahydroindenyl)]-dichlorotitanium
4-($\eta^5$-3'-trimethylsilylcyclopentadienyl)2-trimethylsilyl-4,7,7-trimethyl-($\eta^5$-4,5,6,7-tetrahydroindenyl)]dichlorotitanium 4-($\eta^5$-3'-tert-butylcyclopentadienyl)-4,7,7-trimethyl-($\eta^5$-4,5,6,7-tetrahydroindenyl)]dichlorozirconium
(tert-butylamido) -(tetramethyl-$\eta^5$-cyclopentadienyl) dimethylsilyldichlorotitanium
(tert-butylamido) -(tetramethyl-$\eta^5$-cyclopentadienyl)1,2-ethanediyldichlorotitanium
(methylamido)-(tetramethyl-$\eta^5$-cyclopentadienyl) dimethylsilyldichlorotitanium
(methylamido) -(tetramethyl-$\eta^5$-cyclopentadienyl)-1,2-ethanediyldichlorotitanium
(tert-butylamido) -(2,4-dimethyl-2,4-pentadien-1-yl) dimethylsilyldichlorotitanium bis(cyclopentadienyl) zirconium dichloride
bis(n-butylcyclopentadienyl)zirconium dichloride
bis(1,3-dimethylcyclopentadienyl)zirconium dichloride
tetrachloro-[1-[bis($\eta^5$-1H-inden-1-ylidene)methylsilyl]-3-$\eta^5$-cyclopenta-2,4-dien-1-ylidene)-3-$\eta^5$-9H-fluoren-9-ylidene)butane]dizirconium
tetrachloro-[2-[bis($\eta^5$-2-methyl-1H-inden-1-ylidene) methoxysilyl]-5-($\eta^5$-2,3,4,5-tetramethylcyclopenta-2,4-dien-1-ylidene)-5-($\eta^5$-9H-fluoren-9-ylidene)hexane]-dizirconium
tetrachloro-[1-[bis($\eta^5$-1H-inden-1-ylidene)methylsilyl]-6-($\eta^5$-cyclopenta-2,4-dien-1-ylidene)-6-($\eta^5$-9H-fluoren-9-ylidene)-3-oxaheptane]dizirconium
dimethylsilanediylbis(2-methyl-4-(tert-butylphenylindenyl) zirconium dichloride
dimethylsilanediylbis(2-methyl-4-(4-methylphenylindenyl) zirconium dichloride
dimethylsilanediylbis(2-methyl-4-(4-ethylphenylindenyl) zirconium dichloride
dimethylsilanediylbis(2-methyl-4-(4-trifluoromethylphenylindenyl)zirconium dichloride
dimethylsilanediylbis(2-methyl-4-(4-methoxyphenylindenyl)zirconium dichloride
dimethylsilanediylbis(2-ethyl-4-(4-tert-butylphenylindenyl) zirconium dichloride
dimethylsilanediylbis(2-ethyl-4-(4-methylphenylindenyl) zirconium dichloride
dimethylsilanediylbis(2-ethyl-4-(4-ethylphenylindenyl) zirconium dichloride
dimethylsilanediylbis(2-ethyl-4-(4-trifluoromethylphenylindenyl)zirconium dichloride
dimethylsilanediylbis(2-ethyl-4-(4-methoxyphenylindenyl) zirconium dichloride
dimethylsilanediylbis(2-methyl-4-(4-tert-butylphenylindenyl)dimethylzirconium
dimethylsilanediylbis(2-methyl-4-(4-methylphenylindenyl) dimethylzirconium
dimethylsilanediylbis(2-methyl-4-(4-ethylphenylindenyl) dimethylzirconium
dimethylsilanediylbis(2-methyl-4-(4-trifluoromethylphenylindenyl)dimethylzirconium
dimethylsilanediylbis(2-methyl-4-(4-methoxyphenylindenyl)dimethylzirconium
dimethylsilanediylbis(2-ethyl-4-(4-tert-butylphenylindenyl) dimethylzirconium
dimethylsilanediylbis(2-ethyl-4-(4-methoxyphenylindenyl) dimethylzirconium
dimethylsilanediylbis(2-ethyl-4-(4-ethylphenylindenyl) zirconium diethyl
dimethylsilanediylbis(2-ethyl-4-(4-trifluoromethylphenylindenyl)dimethylzirconium
dimethylsilanediylbis(2-ethyl-4-(4-methoxyphenylindenyl) dimethylzirconium.

10. A catalyst system as claimed in claim 1, wherein the support used comprises inorganic oxides selected from silicon oxide, aluminum oxide, zeolites, MgO, $ZrO_2$, $TiO_2$, $B_2O_3$, CaO, ZnO, $ThO_2$, $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ or $Li_2O$, or at least one polymer.

11. A process for preparing a polyolefin by polymerization of one or more olefins in the presence of a catalyst system as claimed claim 1.

* * * * *